United States Patent Office 3,798,103
Patented Mar. 19, 1974

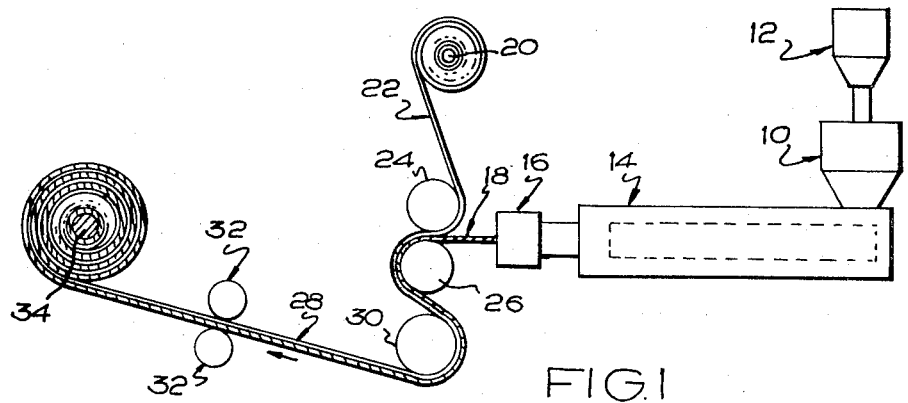
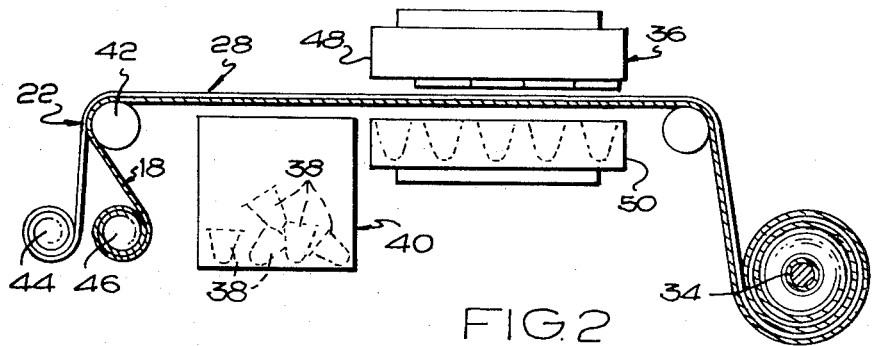
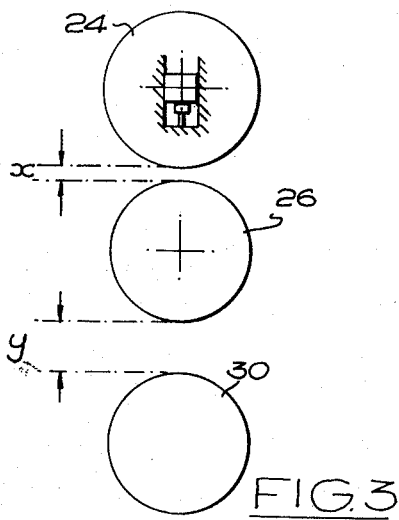
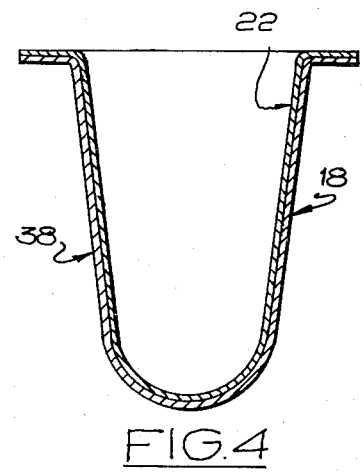

3,798,103
LAMINATING INCOMPATIBLE POLYSTYRENE AND VINYL CHLORIDE OR ACRYLIC PLASTIC SHEETS
Thomas Norman Gaunt, 179 Wetherby Road, Leeds 17, Yorkshire, England
Continuation-in-part of abandoned application Ser. No. 823,986, May 12, 1969. This application Feb. 25, 1972, Ser. No. 229,347
Int. Cl. B29b 1/04
U.S. Cl. 156—244      4 Claims

ABSTRACT OF THE DISCLOSURE

Laminating polystyrene sheet and a synthetic plastics material lining sheet which is highly impermeable to gases and is incompatible with the polystyrene, and thermoforming containers in the laminate, removing them from the laminate and separating the skeletel wastes of the polystyrene and lining sheet for re-use. The satisfactory bonding between the polystyrene and lining sheet is achieved by extruding one or both of the sheets and bring the sheets together under pressure and cooling while the or each extrudate is still soft. The lining sheet is suitably polyvinyl chloride, copolymer of polyvinyl chloride or high barrier acrylic thermoplastic material.

This application is a continuation-in-part of my copending application No. 823,986, filed May 12, 1969, now abandoned.

BACKGROUND OF THE INVENTION

This invention concerns the laminating together of a sheet or film of polystyrene and a sheet or film of synthetic plastic material with which the polystyrene is incompatible i.e. with which the polystyrene will not fuse and the invention also concerns the formation of containers in laminates produced according to the invention.

In the formation of so called thin walled containers, such as beverage containers of synthetic plastic material, high impact polystyrene is now used extensively because it is cheap to buy and easy to thermo-form. Polystyrene containers are used in many applications in the packaging of foodstuffs in addition to being extremely suitable for drinking cups, perhaps the biggest single use of polystyrene.

When it is desired to package liquids however, especially carbonated beverages and other liquids which contain gas in solution, polystyrene has a disadvantage that it is relatively permeable to fluids, in particular gases. Thus, a container of polystyrene filled with say carbonated beverage and sealed would be unsuitable because the gas in solution in the beverage, if released due to a rise in temperature, would permeate through the polystyrene. Also, with some foodstuffs which require to be kept out of contact with the atmosphere until ready for use, polystyrene containers again would be unsuitable because air penetrating the polystyrene could cause rotting of the foodstuffs.

This difficulty with polystyrene is unfortunate because high impact polystyrene has good rigidity and containers constructed therefrom can withstand the normal impacts and loads experienced in day to day handling.

However, because of this disadvantage direction has turned to other material of synthetic plastics which do not have the polystyrene permeability problem. An example of such a material is polyvinyl chloride (PVC) or copolymer thereof and another example is high barrier acrylic thermo-plastics material of which an example is Barex 210 as manufactured by Vistron Corporation, Midland Building, Cleveland, Ohio, U.S.A., an acrylonitrile polymer under U.S. Pat. No. 3,458,617, granted July 28, 1969.

These materials have the necessary impermeability characteristic insofar as they are sufficiently gas impermeable for excluding air in any prohibitive quantity from the interior of a sealed container formed in such material, and moreover, if such a container holds a carbonated beverage such as beer or a soft drink, the carbon dioxide in the beverage will not escape to any appreciable extent through the container wall.

However, PVC its copolymers and Barex 210, are on the one hand much more expensive than polystyrene, especially the Barex 210, and secondly the PVC and Barex do not have the same rigidity as a polystyrene container of the same thickness. To form a container in PVC or Barex 210 of the same rigidity as a polystyrene container would mean making the PVC or Barex 210 container a number of times thicker than the polystyrene container, and cost considerations would make this totally unacceptable.

Thus, there has followed the development that the polystyrene sheet should be laminated with a synthetic plastic sheet which is relatively highly impermeable to fluids and the containers formed therein so that the combined advantages of impermeability to gas, rigidity and cheapness could be obtained in a single container having an outer case of polystyrene and inner liner of said sheet which is highly impermeable to fluids.

Another difficulty arises in this connection because PVC copolymers of PVC and Barex 210 are all incompatible with the polystyrene, making effective lamination to polystyrene, and the subsequent satisfactory formation of containers therein, very difficult.

At least one U.S. patent, namely U.S. Pat. No. 3,579,-395 to Rath tackles this problem. Rath takes a sheet in web form of bi-axially orientated polystyrene and laminates it to another web of plastic material by what is termed "block-bonding." This is a process wherein the surfaces of the sheets which are brought together are treated beforehand to ensure the bonding and the three possible treatment methods given in Rath are corona discharge, flame treatment and acid treatment, with corona discharge taking precedence as it is described with reference to and illustrated in Rath drawings. Rath is dealing with cold fully formed sheets in his laminating process and he admits at lines 21 to 29 of column 2 that laminating together satisfactory polystyrene and other plastic sheet material without "block-bonding" is not possible. He states that "the attempted forming is distorted, contains bubbles, and separation occurs in various areas. In other words, without the treating and compression steps the laminate is useless, and no usable product can be made from it." Rath goes on to define "block-bonding" as used in his specification and at lines 30–31 of column 2 describes the block bonding as being a chemical bond formed as a result of co-action between the treated surfaces.

The present invention has as an object laminating together polystyrene sheet and a synthetic plastic material sheet which is relatively highly impermeable to fluids to produce a laminate which is suitable for the formation of containers, without the creation of a chemical bond or the use of adhesive between the sheets.

A secondary object is to provide for the laminating to be carried out without any requirement for the treating of the surfaces which are brought into contact.

These objects and other objects and advantages will be understood as a description of the invention proceeds.

SUMMARY OF THE INVENTION

The invention is based upon the bringing together of an extrudate of synthetic plastics material and another plastic material in sheet form which may or may not be an extrudate, the or each extrudate being in a viscous or molten state when the lamination takes place and the laminate is pressed as simultaneous cooling takes place. In the invention one of the sheets is polystyrene and it is preferably an extrudate, and the other sheet which may or may not be an extrudate is preferably PVC or PVC copolymer or a high barrier acrylic thermo-plastic material.

The pressing and cooling effect is preferably applied by cooled, nip calendering rollers.

BRIEF DESCRIPTION OF THE DRAWINGS

FIG. 1 shows the layout of apparatus for laminating extruded polystyrene and Barex 210;

FIG. 2 shows the formation of containers in and removal of the containers from the laminate produced in the apparatus of FIG. 1;

FIG. 3 shows in enlarged detail the gap between the nip rollers in the apparatus of FIG. 1; and FIG. 4 is a cross sectional elevation of one of the containers produced according to the invention.

DESCRIPTION OF THE PREFERRED EMBODIMENT

Referring to the drawings, reference is made to FIGS. 1 and 2 in order to describe in general the method of laminating polystyrene and Barex 210, the subsequent formation of containers in the laminate and separation of the skeletal waste of the polystyrene and Barex 210 for re-use in the method.

In FIG. 1, there is shown a feed hopper 10 into which granulated dry polystyrene is fed from a metering device 12. The granulated polystyrene passes to a combined extruding and heating apparatus 14 wherein the granules are softened until they become a fluent coherent mass which is fed continuously, by the unit 14, to an extruding head 16 of which the extruding die apperture is in the form of a horizontal slit so that a sheet 18 of soft polystyrene is extruded from head 16 continuously.

From a storage reel 20, Barex 210 designated by reference numeral 22 in the drawings is fed continuously so as to meet the polystyrene 18 whilst it is still soft and as it passes between a pair of nip rollers 24 and 26 which are cooled so as to solidify the polystyrene 18 and so as also to press together the sheets 18 and 22 of the resulting laminate. The laminate, which is illustrated by numeral 28 for reference, passes round roller 26 and then round a third roller 30 which is also cooled and the laminate is drawn from the roller group 24, 26 and 30 by means of a pair of nip rollers 32 which preferably are part rubber covered or are of rubber material. Eventually, the laminate 28 is wound into roll form on a spindle 34.

FIG. 2 shows the spindle 34 supported at one end of a thermo-forming apparatus indicated generally by numeral 36, which forms in the laminate 28, containers 38 which subsequently are removed from the laminate and are dropped into collecting bin 40. As the laminate 28 travels beyond the collecting bin 40, it passes over a separation roller 42 from which the individual skeletal wastes of the polystyrene 28 and the Barex 22 are made to travel on different paths to wind up spools 44 and 46 so that the skeletal wastes of sheets 18 and 22 are separated and these skeletal wastes can be re-used. The containers 38, one of which is shown in enlarged detail, in FIG. 4, are formed by a vacuum forming process. The forming dies 48 and 50, as shown in FIG. 2, are reciprocable towards and away from one another to enable containers which are formed in the laminate 28 and are cut therefrom to travel to the bin 40. In the formation of the containers, local regions of the laminate are softened by heat and then formed in the forming apparatus.

Thus, although the sheets of the laminate are incompatible, they should have softening temperatures which are close together to enable the sheets to be vacuum or otherwise thermoformed together, polystyrene, Barex, PVC and PVC copolymers have similar softening temperatures.

Polystyrene and the Barex 210, which is a high barrier acrylic thermo-plastics material, are incompatible or, in other words, will not fuse together and therefore by their chemical compositions these materials are difficult to laminate. The present invention achieves a satisfactory lamination effect by applying the Barex 210 to the polystyrene sheet whilst it is still soft after being extruded from extruder die 16. Because the polystyrene is soft, it acts more like a liquid in wetting the contact surface of the Barex 210 and therefore the creation of air bubbles between the contacting surfaces is avoided. It is well known that the creation of these air bubbles between layers in a flexible laminate is a major cause in the creation of an unsatisfactory product. The polystyrene is extruded from the die head 16 at a temperature in the range of 190° to 230° C. and ideally in the range 200° to 220° C. to ensure that it is in the soft condition when it meets the Barex sheet 22.

Another vital step in the process in achieving a satisfactory laminate is the pressing together of the Barex sheet 22 and polystyrene 18 whilst the laminate or at least the polystyrene simultaneously is cooled. This is achieved in the present embodiment of the invention by passing the laminated sheets between the nip provided by rollers 24 and 26. Upper roller 24 is capable of vertical adjustment relative to lower roller 26 and in the method, if reference is made to FIG. 3, it is to be explained that the clearance $x$ between rollers 24 and 26 is made less than the combined thickness of the sheets 22 and 18 so that as the laminated sheets pass between rollers 24 and 26, roller 24 is raised and, in effect, the laminate supports the weight of roller 24 which give the pressure on the sheets as the polystyrene is being cooled. In actual fact, it is preferred that the gap $x$ should be less than the thickness of the polystyrene sheet only thus ensuring a good pressure on the laminate while simultaneously it is being cooled. The pressure applied will, of course, be dictated by the weight of the roller 24. The laminate 28 also passes through the gap $y$ between roller 26 and the third roller 30 but this gap is set so that there is no pressure applied to the laminate as it passes therebetween.

The rollers 24, 26 and 30 are as stated previously cooled and their temperature preferably is in the region of 40° to 80° C. and is maintained by circulating cooling fluid through each of the rollers.

Rollers 24, 26 and 30 are smooth surfaced steel rollers which, in fact, calender the laminate to provide a smooth surface finish on the polystyrene.

The nip roller 32 not only serve to draw off the laminate 28 and supply same to spindle 34 but also serve to tension the laminate 28 as it travels between roller 30 and the said nip rollers 32. During its travel between roller 30 and nip rollers 32, the laminate is still cooling and the tensioning of the laminate whilst it is cooling is beneficial in maintaing the effective bonding between the sheets achieved by the rollers 24, 26 and 30.

FIG. 2 shows the roll of laminate as being wound on spindle 34 but it is to be mentioned here that if desired the laminate could travel directly from nip rollers 32 to the thermo-forming apparatus 36 without first being stored in reel form.

In another arrangement, instead of the laminate 28 travelling directly to a single spindle 34, it may be cut in the direction of its length to provide two or more spearate rolls of laminated material depending upon the width of the thermo-forming machine in which the laminated material will be used as compared to the width of the extrudate 18 as it passes from the die head 16.

Tests with this method have shown that a satisfactory bond is set up between the polystyrene 18 and the Barex sheet 22 but this bond is not so strong as to prevent the separation of the polystyrene and Barex as indicated at roller 42 in FIG. 2 for the re-use of the skeletal wastes of these materials.

It is believed that the bonding is achieved by virtue of the fact that at least one of the sheets of the laminate is in soft extruded form and the pressing together of the sheets of the laminate, together with the cooling effect, effects a curing of the soft polystyrene and also a differential dimensional change in relation to the Barex 210 and this differential dimensional change effects a binding between the two sheets of the laminate which binding remains until the sheets are physically torn apart.

Of the inner container, such as illustrated in FIG. 4, one may be able to pull out the inner liner 22 of Barex from the rigid outer case 18 of polystyrene but it is to be pointed out that these containers principally will be sealed and will be for holding carbonated beverage or foodstuffs. The containers will require to be used only once and if filled with carbonated beverage then the pressure, created by the beverage in the interior of the container, would compress liner 22 even more firmly against outer case 38. The real advantage of the container is, of course, that the liner 22 will prevent the permeation of any appreciable quantity of gas through the container wall while the outer case 18 of polystyrene will provide the necessary rigidity for the container.

The sheets of the laminate, it is to be pointed out, have been shown in the accompanying drawings in exaggerated size in the interests of clarity. In actual fact, the thickness of the polystyrene will be likely to be in the range of ten-thousandths of an inch to fifty-thousandths of an inch while the lining sheet of Barex 210 will most probably be in the range of one-thousandth of an inch to six-thousandths of an inch. In a typical example, the Barex would be three-thousandths of an inch while the polystyrene would be twenty-thousandths of an inch and the gap $x$ would be set at eighteen-thousandths of an inch.

It is well known that these plastic materials attract and carry a large amount of static electricity and it may be that the static electrical charge carried on the Barex and polystyrene is a contributory factor in achieving the satisfactory bond which has been achieved. However, the information at present available on static charges as created in and carried by thermoplastic sheets is extremely little and its is not possible, at this stage, to offer any theoretical explanation. However, it is within the present invention to create "synthetically" positive and negative charges on the surfaces which are to be brought together in a lamination process and subsequently, after the formation and removal of the containers, to apply an anti-static or reversing potential to remove the attraction created by the static electricity between the sheets of the laminate thus making the separation easier. However, this does not appear to be necessary with the experiments carried out to date as, provided that one of the sheets of the laminate is in molten hot extruded form when the other is applied thereto, satisfactory lamination results and also the skeletal wastes can be separated readily.

The Barex sheet 22 is shown in FIG. 1 as being fed from a reel 20 but it is to be pointed out that the Barex sheet 22 in addition to the polystyrene 18 may be extruded and the two extrudates 18 and 22 brought directly into contact while still in the soft molten form. Moreover, it is possible to extrude only the Barex 22 and feed the polystyrene 18 from a pre-formed roll of polystyrene and the same effect is achieved.

The example described in the drawings and explained herein has been restricted to the use of Barex 210 or in its widest sense, high barrier acrylic thermoplastic material, but the same results can be achieved with polyvinyl chloride or a copolymer of polyvinyl chloride, which materials again are incompatible with polystyrene but have the required gas impermeable characteristic necessary for the linings of containers to hold perishable foodstuffs and carbonated beverages.

It will be seen that the present invention achieves the bonding together of incompatible plastics sheets of which one is polystyrene, without the setting up of a block bond or a chemical bond between the contacting surface and without the necessity of pre-treating the surfaces for the achievement of a chemical bond. Because there is no chemical bond betwen the sheets of the laminate, subsequent separation of the skeletal wastes, as indicated at 42 in FIG. 2, is simple. If a chemical bond were established between the the sheets of the laminate then separation could be extremely difficult and if achieved may be unsatisfactory if the chemical bond turns out to be stronger than the weaker areas of the skeletal waste.

Where Barex, PVC or PVC copolymer is extruded and forms one of the sheets of the laminate, then this will be extruded, generally speaking, at the same temperature as polystyrene is extruded in the invention, although the temperature range may be slightly less than that for polystyrene.

Barex 210 has been found to be an extremely suitable material to use in the invention because it is highly resistant to chemical attack and impact, making it suitable for use in containers which are to hold corrosive material.

I claim:

1. A method of laminating a polystyrene sheet to a fluid and gas impermeable lining sheet of thermoplastic material selected from the group consisting of polyvinyl chloride and an acrylonitrile polymer which is incompatible with said polystyrene sheet comprising:
    extruding polystyrene as a sheet in hot molten form from an extruder die at a temperature in the range of 190° C. to 230° C., while said extruded polystyrene die is in a hot, highly viscous sheet form, joining a gas-impermeable lining sheet of thermoplastic material selected from the group consisting of polyvinyl chloride and acrylonitrile polymer; and
    passing the joined polystyrene and lining sheets through a nip defined by an upper roller and a lower roller maintained at a temperature between 40° C. to 80° C., the rollers being spaced to leave a gap of less than the combined thickness of the joined polystyrene and lining sheet, and the upper roller being capable of free upward movement so that a simultaneous pressure and cooling result from the laminate supporting the weight of said upper roller, thereby causing said polystyrene and liner sheets to become laminated under cooling and pressure.

2. A method as claimed in claim 1 wherein said laminate after passing through said first and second rollers is passed through the nip of a third roller positioned below said second roller, said third roller additionally cooling said laminate while applying substantially no nip pressure.

3. A method as claimed in claim 1 wherein said laminate is formed from an outer sheet of polystyrene and an inner sheet of polyvinyl chloride in a thickness of 1–6 thousandths of an inch and wherein said laminate is thereafter vacuum formed at elevated temperature and cooling to produce a thin wall container in which the lining sheet forms the inner surface of the container and is adapted to be removed, and separately skeletonal waste which remains.

4. A method as claimed in claim 1 wherein said lining sheet is polyvinyl chloride which is extruded from an extruding die at a temperature in the range of 180° C. to 220° C. before it is joined to said hot polystyrene sheet.

References Cited
UNITED STATES PATENTS

| | | | |
|---|---|---|---|
| 3,260,781 | 7/1966 | Lux et al. | 264—321 |
| 3,481,818 | 12/1969 | Wellen | 156—244 X |
| 3,579,395 | 5/1971 | Rath | 156—94 |
| 3,589,976 | 2/1971 | Erb | 161—165 |
| 3,669,794 | 6/1972 | Mazur | 156—244 |

EDWARD G. WHITBY, Primary Examiner

U.S. Cl. X.R.

156—267; 161—252; 264—90

UNITED STATES PATENT OFFICE
CERTIFICATE OF CORRECTION

Patent No. 3,798,103　　　　　　　　　　Dated March 19, 1973

Inventor(s) Thomas Norman Gaunt

It is certified that error appears in the above-identified patent and that said Letters Patent are hereby corrected as shown below:

Priority: Great Britain　23514/68 of May 17, 1968

Signed and sealed this 17th day of September 1974.

(SEAL)
Attest:

McCOY M. GIBSON JR.　　　　　　　　C. MARSHALL DANN
Attesting Officer　　　　　　　　　Commissioner of Patents